(12) United States Patent
Van Citters

(10) Patent No.: US 8,642,723 B2
(45) Date of Patent: Feb. 4, 2014

(54) ANGULAR EXTRUSION FOR POLYMER CONSOLIDATION

(75) Inventor: Douglas W. Van Citters, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 13/496,411

(22) PCT Filed: Sep. 16, 2010

(86) PCT No.: PCT/US2010/049140
§ 371 (c)(1),
(2), (4) Date: Mar. 15, 2012

(87) PCT Pub. No.: WO2011/035038
PCT Pub. Date: Mar. 24, 2011

(65) Prior Publication Data
US 2012/0178892 A1    Jul. 12, 2012

Related U.S. Application Data

(60) Provisional application No. 61/243,074, filed on Sep. 16, 2009.

(51) Int. Cl.
*C08G 63/02* (2006.01)
*C08G 64/00* (2006.01)

(52) U.S. Cl.
USPC .............. 528/502; 264/176.1; 264/210

(58) Field of Classification Search
USPC ................. 264/176.1, 210; 526/352
See application file for complete search history.

(56) References Cited

U.S. PATENT DOCUMENTS

| | | |
|---|---|---|
| 7,235,736 B1 * | 6/2007 | Buller et al. .......... 136/251 |
| 2005/0167008 A1 | 8/2005 | Chandrasekar et al. |
| 2006/0130549 A1 | 6/2006 | Zhu et al. |
| 2006/0248980 A1 | 11/2006 | Mann et al. |
| 2007/0256764 A1 | 11/2007 | Han et al. |
| 2008/0138163 A1 | 6/2008 | Moscoso et al. |

OTHER PUBLICATIONS

Victor A. Beloshe et al. Engineers; Society of Plastics Engineers; Equal-channel, Multiple-Angular Extrusion of Semi-Crystalline Polymers; pp. 1-4, May 18, 2011.*
International Search Report and the Written Opinion cited in related PCT Application No. PCT/US2010/049140, Date of Mailing: May 30, 2011, 9 pages.

* cited by examiner

*Primary Examiner* — Terressa Boykin
(74) *Attorney, Agent, or Firm* — Lathrop & Gage LLP

(57) ABSTRACT

Angular extrusion (AE) methods for creating monolithic polymers with high crystallinity, but small crystallite size, are disclosed. The methods involve consolidating granular polymer in an extrusion channel having at least one strain-imposing feature.

22 Claims, 6 Drawing Sheets

A            B            C

ANGULAR EXTRUSION FOR POLYMER CONSOLIDATION

RELATED APPLICATIONS

This application claims priority of U.S. Provisional Application No. 61/243,074 filed on Sep. 16, 2009, the content of which is hereby incorporated into this application by reference.

BACKGROUND

The number of total joint arthroplasty procedures performed worldwide has steadily increased over the past ten years. In the United States alone, nearly one million total knee and total hip replacements are performed annually. With no known biological remedies for osteoarthritis or rheumatoid arthritis, and with the U.S. elderly population expected to increase by about 7% by 2030, the number of total knee and hip arthroplasties is likely to increase.

In addition to these "primary" procedures, nearly 80,000 total joint devices fail and are revised every year. Recent data show that the number of revision surgeries has increased at about the same rate as primary surgeries, and the majority of revisions are due to total mechanical failure of the polymer bearing or patient reaction to polymer wear debris.

Ultra high molecular weight polyethylene (UHMWPE) is the material of choice for joint devices because of its toughness, low friction, and exceptional abrasion resistance. Due to its very high molecular weight, UHMWPE has a melt viscosity in the region of 1010 Pa·s and does not become fluid when heated above its crystalline melting point (138-142° C.). Instead, UHMWPE becomes a translucent, amorphous, rubbery material, which has limited consolidation of the resin to the use of methods, such as compression molding, direct compression molding, hot isostatic pressing, and ram extrusion.

Compression molding involves placing preformed or granular plastic material in a heated mold until it is softened to a pliable state. A hydraulic press then compresses the pliable plastic against the mold to form the desired object, and static pressure is maintained while the plastic cures. Ram extrusion involves heating plastic pellets or chips until the polymer is molten, then forcing the molten material through a die, and cooling the formed object. Typical pressures and temperatures for both compression molding and ram extrusion of UHMWPE are 3-5 MPa and 180-220° C. Processing at these pressures and temperatures leads to a small amount of autocrosslinking.

Outside the field of plastics, ram extrusion has been used to consolidate metal powders via a cold pressing process. This process involves applying pressure to a powdered metal sample in order to create a monolith. The consolidation process compacts the powder and causes the particles to be deformed such that the particles interlock and bind together. The deformed particles fill what would otherwise be void spaces, and the density and strength of the material increases.

Equal Channel Angular Extrusion (ECAE) is a specialized form of cold pressing. By forcing metal powder around a corner within a die, ECAE provides for the creation of bulk nanocrystalline material via low-temperature consolidation with no reduction in cross-sectional area, no introduction of impurities, and the possibility of a continuous—rather than a batch—process. The ECAE process has been successfully applied to metallic and ceramic materials; polymers, however, have not been consolidated through ECAE.

SUMMARY

The presently disclosed instrumentalities advance the art by providing an angular extrusion method for creating monolithic polymers with high entanglement density. In one aspect, the polymers may be monolithic polymers with high crystallinity but small crystallite size. In an embodiment, a method for producing a monolithic polymer includes performing angular extrusion on a granular polymer or a granular polymer resin. In another embodiment, the disclosed methods may involve consolidating granular polymer in an extrusion channel having at least one strain-imposing feature.

In another embodiment, a method for producing a monolithic polymer may include the steps of (a) dispersing a granular polymer or a granular polymer resin within a first channel of a die and (b) exposing the granular polymer or granular polymer resin to increased pressure, increased shear and/or elevated temperature as it moves through a portion of the die that forms at least one strain-imposing feature, thereby forming a consolidated (or monolithic) polymer. As used herein, the terms increased pressure, increased shear and elevated temperature are relative to normal conditions. Examples of normal conditions may be, for example, room temperature, normal shear force and normal ambient atmosphere in a typical room. In one aspect, said at least one strain-imposing feature may be an angle of less than 180 degrees or a twist. In another aspect, said at least one strain-imposing feature may be an angle of 135 degrees or less, an angle of 120 degrees or less, an angle of 90 degrees or less, an angle of 60 degrees or less, an angle of 45 degrees or less, an angle of 30 degrees or less, or a twist.

Granular polymers or granular polymer resins suitable for the disclosed methods may include, but are not limited to polycarbonates, polystyrenes, polyurethanes, polyesters, polyanhydrides, polyolefins, polyethylenes, polypropylenes, polyether ether ketones, or mixture and block copolymer thereof. More preferably, the granular polymer is a polyethylene, which may include, by way of example, ultra high molecular weight polyethylene (UHMWPE), high density polyethylene (HDPE), medium density polyethylene (MDPE), low density polyethylene (LDPE), or very low density polyethylene (VLDPE). Ultra high molecular weight polyethylene (UHMWPE) is the preferred polyethylene.

In one preferred embodiment, the granular polymer or granular polymer resin has a melt viscosity greater than 1000 Pa s.

In another aspect, the disclosed methods may include a step of thermally, chemically, radiationally, or mechanically treating the monolithic polymer. The thermal treatment may include heating the monolithic polymer to a temperature between 100-400 degrees Celsius, more preferably from 125 to 220 degrees Celsius. The monolithic polymer may be held at this elevated temperature for a period between one minute and seven days, preferably, from 1 hour to 4 days, or more preferably, from 2 hours to 24 hours. The radiation treatment may include a step of exposing the monolithic polymer to radiation, preferably ionizing radiation.

In another embodiment, a monolithic polymer may contain consolidated, nanocrystalline, highly entangled, ultra high molecular weight polyethylenes.

DETAILED DESCRIPTION

Figure 1:
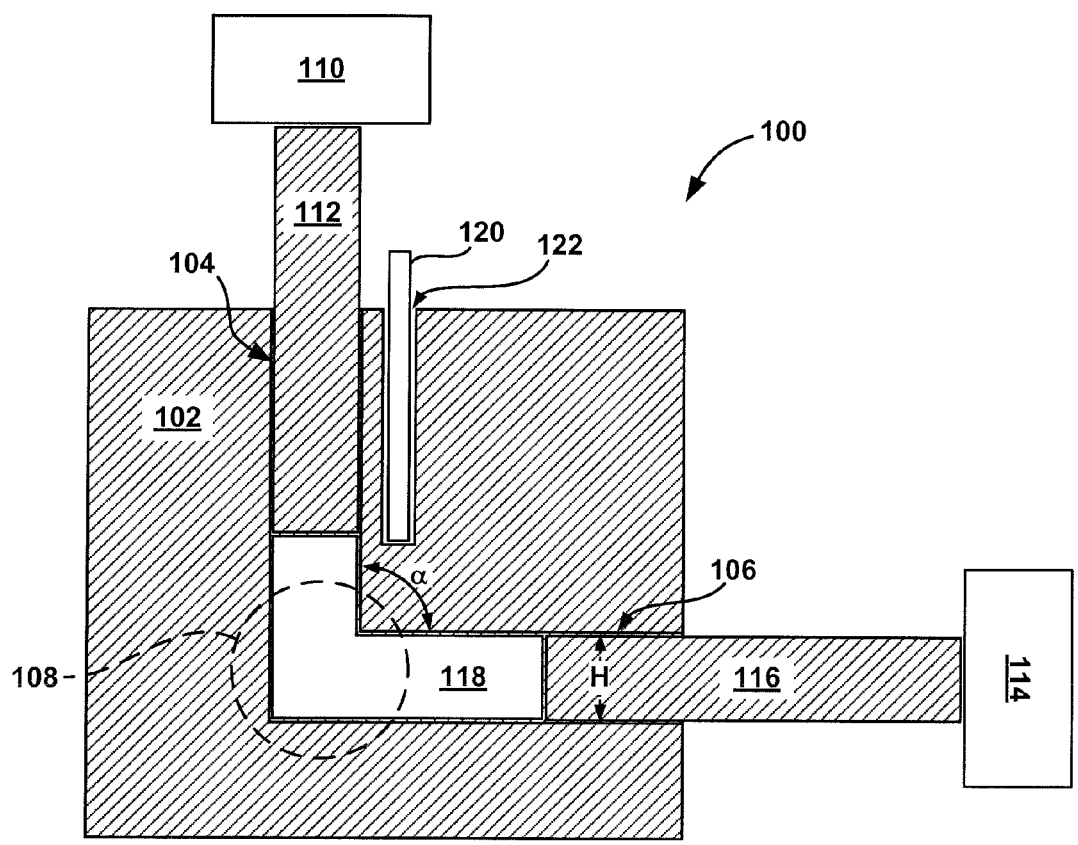
FIG. 1 shows a cross-section of an Equal Channel Angular Extrusion (ECAE) apparatus.

Angular extrusion (AE) methods for consolidating granular polymer into monolithic polymers with unique microstructures are disclosed. In particular, the AE methods taught herein produce polymer material of high toughness, but small crystallite size.

The present AE methods differ from prior AE methods, at least, because prior methods utilized preformed, contiguous polymer sheets or monolithic bodies as starting materials for the extrusion processes. Thus, the prior AE methods did not include consolidation, which binds polymer granules together by plastic deformation. Consolidation via the present AE methods leads to improved physical and mechanical properties.

As used herein, "angular extrusion" refers to an extrusion process where the extrusion channel forms an angle. The angle may, for example, be an angle of translation, $\alpha$, or an angle of rotation, $\rho$. The presence of an angle along the extruding path increases the shear force experienced by the extruded material.

"Shearing" is a deformation process where parallel internal surfaces of a material slide past one another.

A "granular polymer or a granular polymer resin" is a polymeric material comprised of particles having diameters of less than one centimeter, typically less than one millimeter, preferably less than 0.5 millimeters, and more preferably less than 300 micrometers, and most preferably less than 150 micrometers. Typically, a granular polymer is in the form of raw polymer resin, small "pebbles," or powder.

For purpose this disclosure, a "monolithic polymer" is a polymeric material in which individual grains (or particles) of the granular polymer or granular polymer resin interact with each other either chemically or physically, thereby forming a polymeric material with dimensions larger than the individual grains. A typical monolithic polymer may, for example, be a sheet, a block, a disc, or a rod. In one preferred embodiment, the monolithic polymer has at least one dimension greater than one centimeter. The terms "monolithic polymer" and "consolidated polymer" may be used interchangeably in this disclosure.

Nanocrystalline materials contain regions of crystallinity having nanometer scale dimensions, e.g., 500 nanometers or less. In one aspect, a nanocrystalline material may contain non-crystalline (amorphous) regions in addition to one or more crystal domains or lamellae. In another aspect, the nanocrystalline material may be a completely crystalline material comprising a plurality of crystal domains.

The term "plastic deformation" refers to permanent, irreversible deformation of a material. The material may be a polymer or other materials, but need not be a "plastic.".

Sintering is a method for making objects from powder, by heating the material to a temperature below its melting point until its particles adhere to each other.

As used herein, a "strain-imposing feature" of an AE apparatus is any feature formed by or within an extrusion channel for the purpose of exposing the extruding material to strain. Exemplary strain-imposing features include, but are not limited to, bends, curves, and twists. An extrusion angle, $\alpha$, created by a bend or curve may be any angle less than 180 degrees, an angle of 135 degrees or less, an angle of 120 degrees or less, an angle of 90 degrees or less, an angle of 60 degrees or less, an angle of 45 degrees or less, or an angle of 30 degrees or less. A twist angle, or angle of rotation, $\rho$, may be an angle of 360 degrees or less, an angle of 270 degrees or less, an angle of 180 degrees or less, an angle of 90 degrees or less, an angle of 60 degrees or less, or an angle of 30 degrees or less.

A cross-section of a ECAE apparatus 100 is shown in FIG. 1. ECAE apparatus 100 contains an extrusion die 102, which forms a first channel 104 joined to a second channel 106. First channel 104 and second channel 106 are of equal height, H, and width, W (not shown). Where first channel 104 and second channel 106 meet, a strain-imposing feature 108 is formed. In FIG. 1, first channel 104 has a vertical orientation, second channel 106 has a horizontal orientation, and strain-imposing feature 108 is an angle, $\alpha$, of 90 degrees.

A forward pressure source 110 applies pressure to plunger 112, while a back pressure source 114 applies pressure to plunger 116. Forward and back pressure sources 110, 114 may, for example, be manual or hydraulic presses. Material 118 is compressed between plungers 112 and 116. An optional heat source 120 disposed within a hole 122 in die 102 heats the die and, by conduction, material 118.

Figure 2:
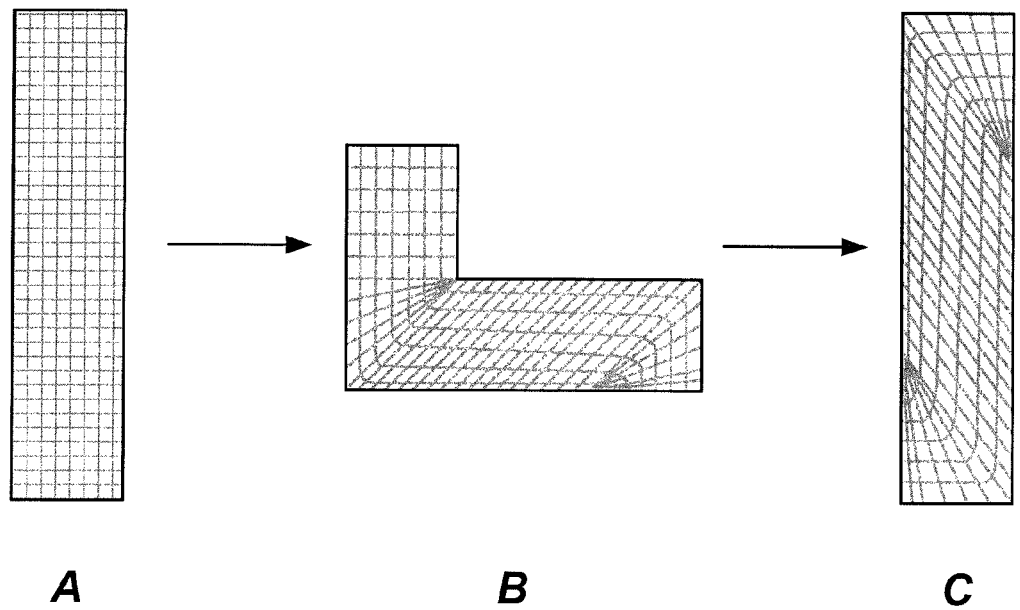
FIGS. 2A-C show a density grid imposed on a material to demonstrate strain effects on the material prior to extrusion (A), as the material passes through a strain-imposing feature of an angular extrusion die (B), and after extrusion (C).

Pressure from pressure sources 110, 114 moves material 118 along the length of die 102 and through strain-imposing feature 108. FIGS. 2A-C show a density grid imposed on a material, such as material 118, to demonstrate strain effects on the material prior to extrusion (A), as the material passes through a strain-imposing feature (B), and after extrusion (C). The strain pattern results from velocity differences of the material as it passes through the strain-imposing feature. Material near the inside of the corner moves slowly, while material nearer the outside of the corner must move more rapidly.

By exposing extruded material to multiple passes through an extrusion apparatus, one can selectively increase or decrease the strain of the final product. For example, taking a material that has been once extruded, rotating the material 180 degrees, and re-extruding the material reduces or eliminates the original strain. A more detailed description of how orientation affects the final properties of angularly extruded products may be found, for example, in U.S. Pat. No. 6,883,359, which is hereby incorporated into this disclosure by reference.

In accordance with the present instrumentalities, ECAE apparatus 100 may be modified. For example, first channel 104 and second channel 106 may be cylindrical and/or of unequal height, width, and/or length. Use of unequal channels may create mechanical changes after the shear process. For example, a larger second channel may permit stress relaxation, while a smaller second channel may promote higher shear forces.

Another modification that may be made to ECAE apparatus 100 is that angle, α, may be any angle less than 180 degrees, an angle of 135 degrees or less, an angle of 120 degrees or less, an angle of 90 degrees or less, an angle of 60 degrees or less, an angle of 45 degrees or less, or an angle of 30 degrees or less.

Figure 3:
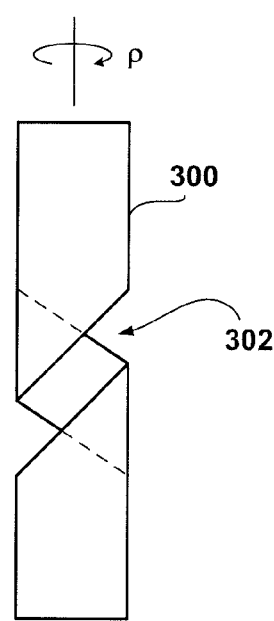
FIG. 3 shows a plan view of an extrusion channel having a twist as a strain-imposing feature.

In an embodiment, angle of translation, α, may be supplemented or replaced by an angle of rotation, ρ, that forms a twist. FIG. 3 shows a plan view of an extrusion channel 300 having a twist 302 that corresponds to an angle of rotation, ρ, which may be an angle of 360 degrees or less, an angle of 270 degrees or less, an angle of 180 degrees or less, or an angle of 90 degrees or less.

An AE apparatus may possess a solitary strain-imposing feature or may include multiple strain-imposing features disposed in series.

Tests have confirmed that no consolidation occurred in the absence of shear. During static tests, where granular polymer was loaded into a first channel and typical operating pressures and temperatures were employed, fully dense material did not form.

Figure 4:
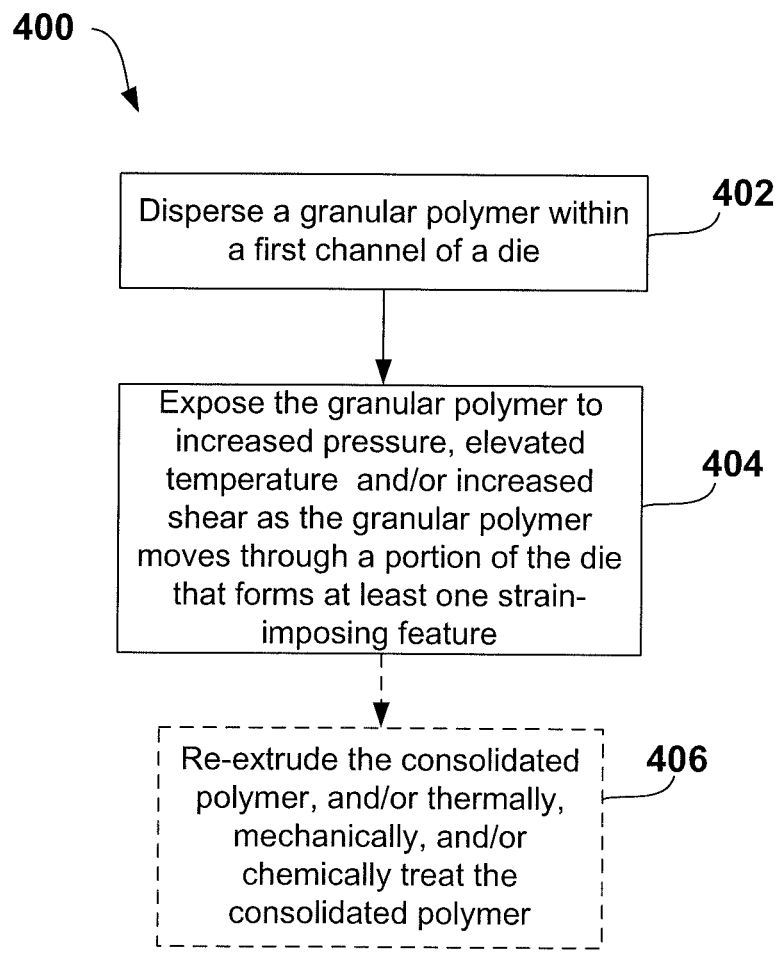
FIG. 4 shows a flowchart of an exemplary method for producing a monolithic polymer by angular extrusion of a granular polymer, according to an embodiment.

FIG. 4 shows a flowchart of an exemplary method 400 for producing a monolithic polymer by angular extrusion of a granular polymer. Method 400 begins with step 402 in which a granular polymer is dispersed within a first channel of a die. In step 404, the granular polymer is exposed to pressure, temperature, and/or shear as it moves through a portion of the die that forms at least one strain-imposing feature. A consolidated (or monolithic) polymer results from step 404, and in optional step 406, the consolidated polymer may be passed through the extrusion die again in the same or a different orientation, and/or it may be thermally and/or mechanically and/or chemically and/or radiation treated.

Post-extrusion thermal treatment of the consolidated (or monolithic) polymer may increase the overall level of consolidation. Thermal treatment may be carried out at an elevated temperature of 100-400 degrees Celsius, more preferably from 125 to 220 degrees Celsius. In an exemplary thermal treatment process, the extruded, consolidated, monolithic polymer may be remelted at about 180° C. for 30-90 minutes either in an ambient atmosphere or in a vacuum oven.

Chemical or mechanical treatments known in the art, such as radiation-induced crosslinking, may also be applied to the extruded, consolidated, monolithic polymer.

Variables associated with the extrusion process include temperature, forward pressure, back pressure, and extrusion rate. The variables are not necessarily independent. Because of frictional effects in the extrusion die, the differential in pressure between the forward and back pressure will dictate the extrusion rate. In one aspect, the friction in the die may create a backpressure. Decreased viscosity of the material associated with a temperature increase will further impact the extrusion rate.

The disclosed methods may be used on various types of polymers including, for example, polycarbonates, polystyrenes, polyurethanes, polyesters, polyanhydrides, polyolefins, polyethylenes, polypropylenes, polyether ether ketones, or mixture and block copolymer thereof.

Within the polymer classes listed above, subclasses may exist. For example, the class "polyethylene" includes at least UHMWPE, high density polyethylene (HDPE), medium density polyethylene (MDPE), low density polyethylene (LDPE), and very low density polyethylene (VLDPE).

UHMWPE is a linear homopolymer characterized by a molecular weight in excess of 3.1 million g/mol. It is available commercially with molecular weights between 3.1 and 6 million g/mol, usually including between 100,000 and 250,000 monomer units per molecule, and an average particle diameter ranging from 50 to 250 micrometers. When processed by traditional methods, UHMWPE is characterized by less efficient packing of its polymer chains than HDPE, as evidenced by its lower density (0.930-0.935 $g/cm^3$). When processed by traditional methods, HDPE is characterized by a density of at least 0.941 $g/cm^3$; MDPE is characterized by a density range of 0.926-0.940 $g/cm^3$; LDPE is characterized by a density range of 0.910-0.940 $g/cm^3$; and VLDPE is characterized by a density range of 0.880-0.915 $g/cm^3$.

AE of polymers has commercial potential as a method of forming an improved bearing surface in any application where high wear resistance is desired and high mechanical strength and ductility are necessary. Because the disclosed methods allow these material properties to exist in an already FDA-approved material, they may be used, for example, in the total joint replacement market. In particular, the materials may be used for total arthroplasty bearing surfaces.

The following examples set forth methods for producing polymer monoliths of high toughness and small crystallite size. These examples teach by way of illustration, not by limitation, and should not be interpreted as being unduly narrow.

EXAMPLES

Materials and Methods

Apparatus

An ECAE apparatus was fabricated from two 6061 aluminum plates. Each plate was machined to form an "L"-shaped channel that was 0.75 inches wide×0.44 inches deep. The channel contained a 90° angle about four inches from the top and front of the plate. The machined plates were aligned to create a die having an 8 inch long×0.88 inch×0.75 inch tunnel with a 90° corner at its midpoint (see FIG. 1). The plates were then bolted to one another through holes machined into the plates.

Five additional holes were machined into the die to permit insertion of five, 200 watt cartridge heaters. The heaters were controlled using a feedback loop and an Omega CN76000 DIN controller.

Two plungers were machined from 6061 aluminum with a cross-section that allowed insertion into the previously described tunnel. The plunger ends extending from the die were threaded to facilitate attachment to hydraulic actuators that provided forward pressure and back pressure.

The extrusion die was mounted in an Instron® 8501 servohydraulic load frame capable of delivering a 20 ton load to the forward pressure plunger. A second, manually controlled hydraulic ram was placed on a fixture allowing up to 10 tons of load to be delivered to the back-pressure plunger. Forward pressure and extrusion speed were monitored using the load cell and a linear variable differential transformer (LVDT) included with the load frame. Backpressure was monitored using a custom-built load cell that was monitored in real-time using Instron® FastTrack Software.

Extrusion

Medical grade GUR® 1050 UHMWPE resin was supplied by Ticona Corporation, Florence, Ky.

Sample resin was first placed loosely into the vertical channel and compacted at room temperature to approximately 50% of its original volume. Pressure was applied based on the experimental design shown in Table 1. The temperature was then raised to the predetermined extrusion temperature (Table 1). Extrusion continued for approximately 82 mm. Back pressure of 2200 psi was held throughout the extrusion.

TABLE I

Tests performed with ECAE on GUR 1050 UHMWPE

| Speed (mm/min) | Temp (C.) | Back Pressure (Mpa) | Passes | Thermal Post-process (in or out of die) | Yield stress (Mpa) SD | UTS (Mpa) SD | Strain at Break (%) SD | Toughness (Mpa) SD | Crystallinity |
|---|---|---|---|---|---|---|---|---|---|
| 1 | 130 | 35.7 | 1 | out | 18.6 | 32.6 | 265.9 | 61.1 | 48% |
|   |     |      |   |     | 0.8  | 2.2  | 20.7  | 7.0  |     |
| 15 | 130 | 35.7 | 1 | in | 20.4 | 54.1 | 348.5 | 112.8 | 50% |
|    |     |      |   |    | 1.1  | 4.8  | 20.0  | 12.3  |     |
| 1 | 150 | 35.7 | 1 | in | 18.7 | 46.1 | 354.8 | 99.8 | 47% |
|   |     |      |   |    | 0.7  | 4.0  | 24.7  | 11.8 |     |
| 15 | 150 | 35.7 | 1 | out | 17.9 | 54.2 | 399.4 | 112.5 |  |
|    |     |      |   |     | 0.8  | 4.2  | 16.6  | 10.1  |  |
| 1 | 130 | 51.5 | 1 | in | 19.6 | 52.9 | 369.3 | 112.9 |  |
|   |     |      |   |    | 0.6  | 4.2  | 15.9  | 9.6   |  |
| 15 | 130 | 51.5 | 1 | out | 18.5 | 41.6 | 334.1 | 86.0 |  |
|    |     |      |   |     | 0.8  | 4.8  | 33.5  | 12.2 |  |
| 1 | 150 | 51.5 | 1 | out | 19.6 | 50.7 | 363.9 | 106.5 |  |
|   |     |      |   |     | 0.7  | 6.5  | 29.2  | 14.8  |  |
| 15 | 150 | 51.5 | 1 | in | 19.8 | 47.7 | 340.6 | 99.9 |  |
|    |     |      |   |    | 0.7  | 3.9  | 20.8  | 10.6 |  |
| 1 | 130 | 35.7 | 2 | in | 18.0 | 44.9 | 354.2 | 94.2 | 45% |
|   |     |      |   |    | 0.9  | 4.4  | 25.2  | 10.8 |     |
| 15 | 130 | 35.7 | 2 | out | 19.6 | 47.5 | 376.8 | 106.7 | 48% |
|    |     |      |   |     | 0.5  | 4.3  | 27.1  | 11.7  |     |
| 1 | 150 | 35.7 | 2 | out | 19.4 | 52.2 | 386.5 | 115.5 | 49% |
|   |     |      |   |     | 0.9  | 6.6  | 36.7  | 17.9  |     |
| 15 | 150 | 35.7 | 2 | in | 21.2 | 44.4 | 302.4 | 88.4 |  |
|    |     |      |   |    | 0.2  | 3.7  | 20.0  | 9.2  |  |
| 15 | 130 | 51.5 | 2 | in | 18.4 | 52.8 | 391.3 | 115.4 |  |
|    |     |      |   |    | 0.6  | 7.7  | 35.3  | 18.0  |  |
| 1 | 150 | 51.5 | 2 | in | 21.2 | 56.0 | 378.3 | 121.6 |  |
|   |     |      |   |    | 0.2  | 4.5  | 23.7  | 12.2  |  |
| 15 | 150 | 51.5 | 2 | out | 18.4 | 60.0 | 412.6 | 126.3 | 45% |
|    |     |      |   |     | 0.9  | 8.7  | 29.7  | 18.1  |     |

Some samples were extruded twice, with the second extrusion being rotated 180° from the initial extrusion. This step ensured that shear strain acquired by the samples during the initial extrusion was reversed during the second extrusion.

Some samples were remelted at 180° C. for 90 minutes in the extrusion die, in a vacuum oven, in an inert gas, or in air.

Tensile Testing

Thin sections were cut from the test specimens using a band saw and a sledge microtome. Two-hundred micron thick sections were stamped into tensile specimens using an ASTM type-V die.

All specimens were tested using an Instron® 5500 mechanical load frame equipped with pneumatic grips and a non-contacting video extensometer. Tensile test parameters are specified in ASTM D638. Tests were performed with uniaxial tension at a crosshead extension rate of 25.4 mm per minute. Specimens were tested until the load frame reached full extension or the specimen broke, whichever came first. Data were collected to determine yield strength, ultimate elongation, ultimate tensile strength, and toughness as calculated by the area under the stress-strain curve.

Permanganic Etching

A permanganic etch was prepared according to the method used by Olley R. H. and Bassett, D. C., "An Improved Permanganic Etchant for Polyolefins." *Polymer,* 1982; 23: 1707-10, to selectively remove the amorphous regions from the semicrystalline polymer. The etchant consisted of 65% sulfuric acid, 27% phosphoric acid, 1% potassium permanganate, and 7% deionized water. Disks, 1 cm in diameter, were punched from the thin sections described above, and the polymer was etched in an agitated etchant bath for approximately 150 minutes. After etching, the polymer specimens were removed from the etchant bath and placed in a beaker containing deionized water. This rinse was followed by drying in a vacuum desiccator.

Differential Scanning Calorimetry

Discs weighing approximately 8 to 9 mg were acquired from the thin sections described above using a standard 5 mm punch. The discs were weighed on a balance accurate to 10 micrograms. The samples were subsequently sealed in 30 microliter aluminum pans. calorimetry was performed using a Perkin Elmer® Pyris-6 DSC system equipped with an intracooler and an autosampler. The software controlled DSC was calibrated with indium prior to testing, and an empty aluminum pan was placed in the sample cavity to act as a reference. The sample program heated the samples at 10° C. per minute from 0° C. to 200° C. The total enthalpy of melting was calculated by integrating the endotherm from 80° C. to 150° C. and dividing by the sample mass. This value was normalized to the total enthalpy of melting for a perfect crystal of polyethylene (290 J/g) to determine the percent crystallinity.

Scanning Electron Microscopy

Etched polymer specimens were mounted on aluminum stubs using double-sided carbon adhesive tape. The mounted specimens were coated with 8 nm of gold using an Anatech Hummer 6.2 sputter coating system. Following plating, a small amount of colloidal carbon was painted on a non-imaged portion of the specimen and the mount to improve sample conductivity.

All imaging was performed on a FEI XL-30 field emission gun environmental scanning electron microscope. Images were acquired in high vacuum mode with zero tilt. Nominal working distance was 10 mm, accelerating voltage was 15 kV, spot size was 3, and magnifications ranged from 5,000 to 20,000 times. Secondary electron images were acquired for each specimen to visualize crystallite size and morphology.

Figure 5A:
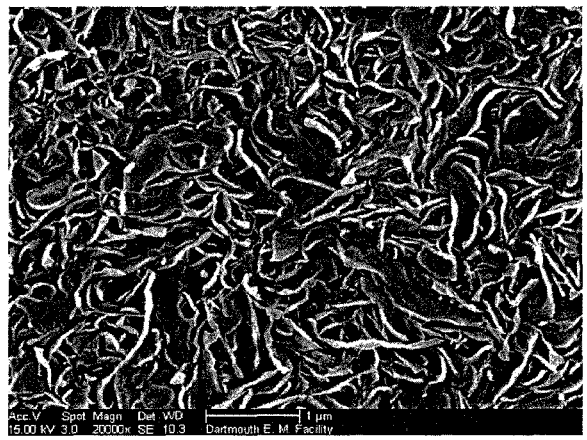
FIGS. 5A-C compare scanning electron micrographs of monolithic polymers formed by compression molding (A), equal channel angular extrusion (B), and compression molding followed by radiation (C), suggesting that the physical entanglements generated by the disclosed process have the same effect on crystallinity as chemical bonds created through radiation crosslinking.
Figure 5B:
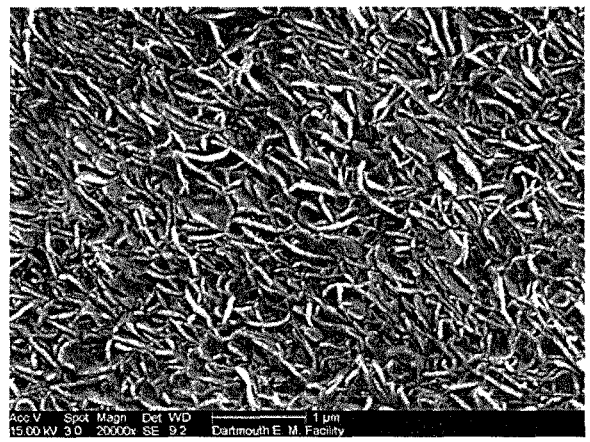
Figure 5C:
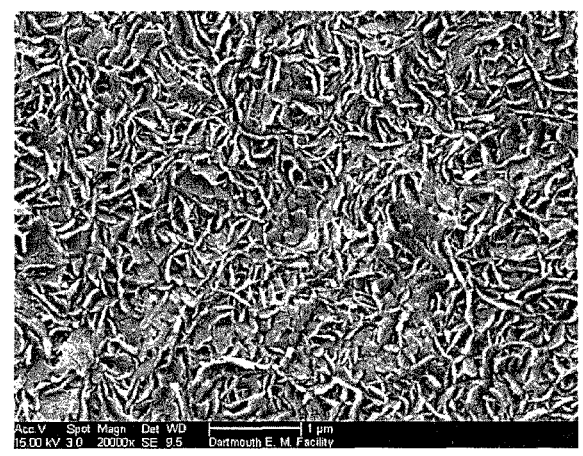

FIGS. 5A-C show exemplary scanning electron micrographs of samples formed by compression molding (A), equal channel angular extrusion (B), and compression molding extrusion followed by radiation (C). FIG. 5A shows an SEM of compression molded GUR1050. The sample contains 61% crystalline material in the form of large plate-like crystals. FIG. 5B shows an SEM of a consolidated (or monolithic) polymer formed by ECAE of granular UHMWPE. The sample contains 48% crystalline material in the form of moderate-size crystals, which are more difficult to etch. FIG. 5C shows an SEM of a consolidated (or monolithic) polymer formed by compression molding of granular UHMWPE, then crosslinked by exposure to 10 Mrad radiation. The sample contains 55% crystalline material in the form of small crystals.

Example 1

Tensile Test

Two samples of UHMWPE that had been twice extruded by ECAE (0° and 180°) before remelting at 180° C. for one hour yielded average ductility of over 375%. The first sample gave an average elongation at fracture of 378.3±23.7%. The second sample yielded elongation at fracture of 412.6±29.7%.

Average Ultimate Tensile Strength (UTS) of the two consolidated samples was 56±4.54 MPa and 60±8.7 MPa, respectively.

Toughness was 121.6±12.2 J and 126.3±18.1 J, respectively. Yield occurred at 21.2±0.2 MPa and 18.4±0.9 MPa.

Figure 6:
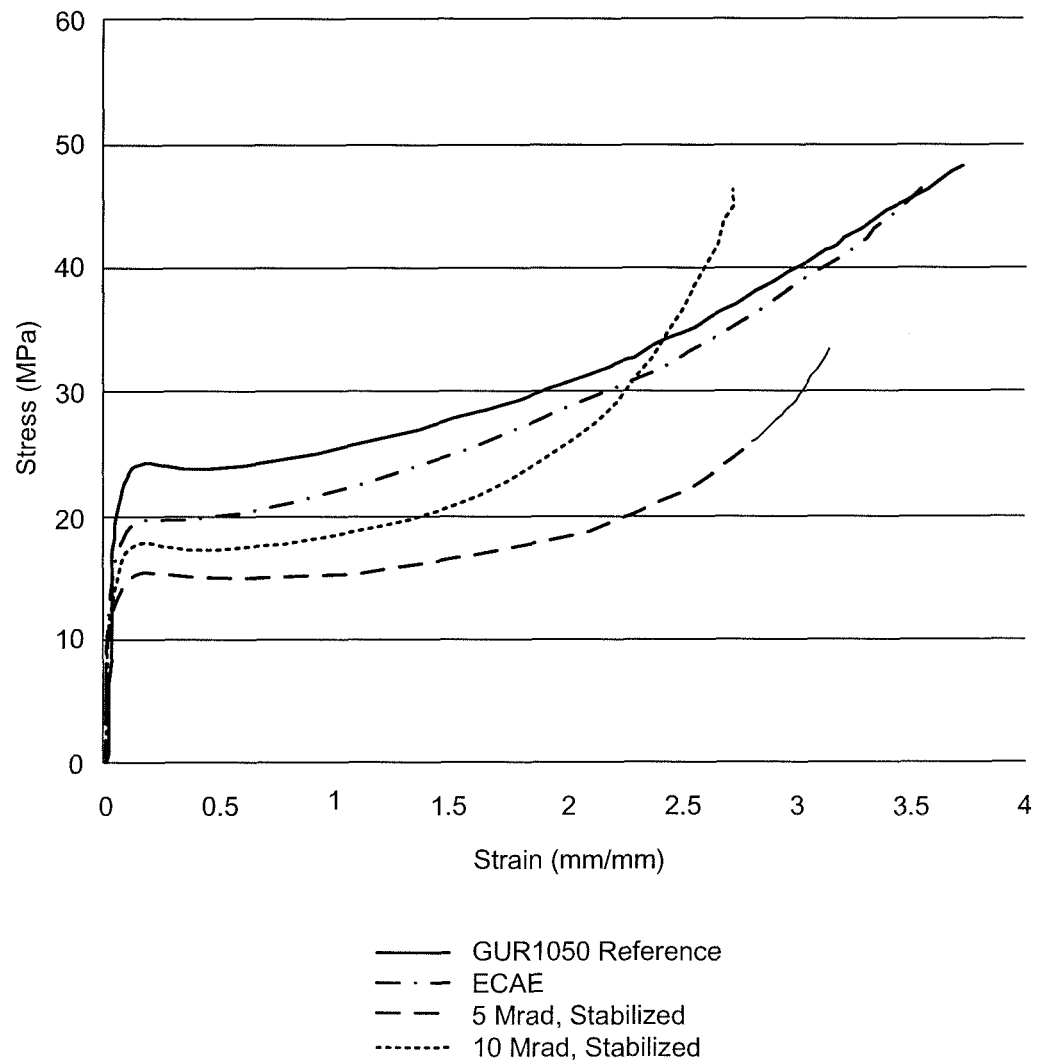
FIG. 6 shows a graph of tensile properties of monolithic polymers formed by traditional methods versus those formed by angular extrusion with and without irradiation stabilization, in accord with multiple embodiments.

FIG. 6 shows a graph of tensile properties of consolidated (or monolithic) polymers formed by traditional methods versus angular extrusion with and without irradiation stabilization. The ECAE sample showed behavior similar to never irradiated reference material.

DSC

Crystallinity was 45% for the consolidated samples.

Figure 7:
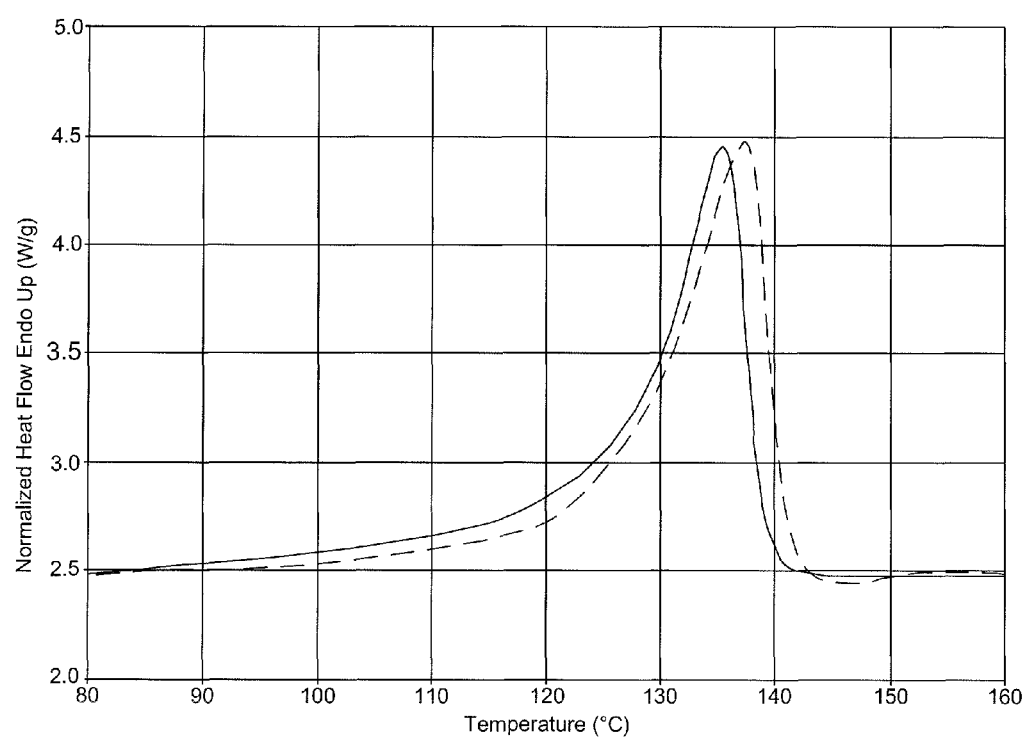
FIG. 7 shows an exemplary Differential Scanning calorimetry (DSC) trace for a consolidated (or monolithic) polymer formed by angular extrusion, in accord with an embodiment, versus a standard ultra high molecular weight polyethylene (UHMWPE) reference material.

FIG. 7 shows an exemplary DSC trace for a consolidated polymer (or monolithic) formed by ECAE versus a standard UHMWPE reference material. The traces have similar shapes, but the ECAE material has a lower melting temperature indicating a smaller average crystal size.

Summary

The consolidated samples showed elongation values of over 300%, which were equal to or greater than much of the crosslinked UHMWPE currently in use. At the same time, they offered a higher ultimate strength and toughness, and a similar yield strength. The ECAE polymer consolidation process produced an interesting anomaly: a polymer of high strength and ductility, despite its low crystallinity.

Example 2

A sample of UHMWPE was thermally treated by heating a sample extruded by ECAE to 150° C. and holding for 60 minutes. The crystallinity of the remelted ECAE sample was lower than conventional UHMWPE, which would suggest a lower yield strength. Because there was negligible crosslinking in the extruded samples, one would expect the consolidated specimens to achieve crystallinities similar to conventionally consolidated UHMWPE (approximately 55%). However, the crystallinity of the extruded sample was determined to be 47-48% by DSC. The mechanism for such a process may involve the residual stress left by the angular extrusion process, but this seems unlikely because there is no correlation between crystallinity and depth from the sides. As the polyethylene flows, friction from the walls would increase the shear stress near the edges. Moreover, multiple passes through the extrusion die, with a specimen rotation of 180 degrees should eliminate much of the internal stress. Any residual internal stress would be eliminated at the melt due to the shape memory property of UHMWPE.

It is more likely that increased chain entanglements caused by ECAE consolidation prevent crystallization from the melt. Reduced ductility of the material, relative to conventional UHMWPE, was observed. Since ductility is a function of mean distance between entanglements, this observation supports the entanglement hypothesis. Alternative methods of creating entanglements, such as radiation crosslinking, have similar effects.

Example 3

Samples of polycarbonate, polystyrene, polyurethane, polyester, polyanhydride, polyolefin, polyethylene, polypropylene, polyether ether ketone, or mixture and block copolymer thereof are twice extruded by ECAE (0° and 180°) as described in Example 1. The samples show superior properties relative to conventionally consolidated forms.

Example 4

The samples of Example 3 are thermally treated by heating each to its melting point and holding that temperature for between 30-90 minutes. The crystallinity of the remelted samples decreases significantly, which suggests a lower yield strength.

Example 5

Combinations of pressure, speed, and temperature lead to materials of differing microstructure, and hence mechanical properties, as shown in Table 1. For example, multivariate regression analysis shows that:
  Increased temperature is positively correlated with better mechanical properties (Yield, UTS)
  Increased extrusion speed is positively correlated with improved properties (Yield, UTS)
  Increased backpressure is negatively correlated with mechanical properties (Yield, UTS, Strain and Toughness)
  Multiple passes are correlated with mechanical properties (UTS, Yield)

It is understood for purposes of this disclosure, that various changes and modifications may be made to the disclosed embodiments that are well within the scope of the present compositions and methods. Numerous changes may be made which will readily suggest themselves to those skilled in the art and which are encompassed in the spirit of the compositions and methods disclosed herein and as defined in the appended claims.

What is claimed is:

1. A method for producing a monolithic polymer comprising the step of performing angular extrusion on a granular polymer to produce said monolithic polymer.

2. The method of claim 1, wherein the granular polymer is selected from the group consisting of polycarbonates, polystyrenes, polyurethanes, polyesters, polyanhydrides, polyolefines, polyethylenes, polypropylenes, and mixtures and block copolymers thereof.

3. The method of claim 1, wherein the granular polymer is a polyethylene.

4. The method of claim 3, wherein the polyethylene is selected from the group consisting of ultra high molecular weight polyethylene (UHMWPE), high density polyethylene (HDPE), medium density polyethylene (MDPE), low density polyethylene (LDPE), and very low density polyethylene (VLDPE).

5. The method of claim 3, wherein the polyethylene is ultra high molecular weight polyethylene (UHMWPE).

6. The method of claim 1, wherein the granular polymer has a melt viscosity greater than 1000 Pa s.

7. A method for producing a monolithic polymer comprising the steps of:
   (a) dispersing a granular polymer within a first channel of a die; and
   (b) exposing the granular polymer to pressure and shear as the granular polymer moves through a portion of the die that forms at least one strain-imposing feature, thereby forming a consolidated polymer.

8. The method of claim 7, wherein the at least one strain-imposing feature is selected from the group consisting of an angle of less than 180 degrees and a twist.

9. The method of claim 7, wherein the at least one strain-imposing feature is selected from the group consisting of an angle of 135 degrees or less and a twist.

10. The method of claim 7, wherein the at least one strain-imposing feature is selected from the group consisting of an angle of 120 degrees or less and a twist.

11. The method of claim 7, wherein the at least one strain-imposing feature is selected from the group consisting of an angle of 90 degrees or less and a twist.

12. The method of claim 7, the strain-imposing feature being selected from the group consisting of an angle of 60 degrees or less, an angle of 45 degrees of less, an angle of 30 degrees or less, and a twist.

13. The method of claim 7, wherein the granular polymer is selected from the group consisting of polycarbonates, polystyrenes, polyurethanes, polyesters, polyanhydrides, polyolefines, polyethylenes, polypropylenes, and mixtures and block copolymers thereof.

14. The method of claim 7, wherein the granular polymer is a polyethylene.

15. The method of claim 14, wherein the polyethylene is selected from the group consisting of ultra high molecular weight polyethylene (UHMWPE), high density polyethylene (HDPE), medium density polyethylene (MDPE), low density polyethylene (LDPE), and very low density polyethylene (VLDPE).

16. The method of claim 14, wherein the polyethylene is ultra high molecular weight polyethylene (UHMWPE).

17. The method of claim 7, wherein the granular polymer has a melt viscosity greater than 1000 Pa s.

18. The method of claim 7, further comprising a step of thermally treating the consolidated polymer.

19. The method of claim 18, wherein the step of thermally treating comprises heating the consolidated polymer to a temperature between 130-400 degrees Celsius and holding the consolidated polymer at said temperature for a period between one minute and seven days.

20. The method of claim 7, further comprising a step of mechanically treating the consolidated polymer.

21. The method of claim 20, wherein the step of mechanically treating the polymer comprises exposing the consolidated polymer to radiation.

22. A monolithic polymer comprising consolidated, nanocrystalline ultra high molecular weight polyethylene prepared by the method of claim 1.

* * * * *